F. L. BIGSBY.
EMERGENCY AUTOMOBILE TIRE.
APPLICATION FILED OCT. 3, 1911.
1,057,388.
Patented Mar. 25, 1913.
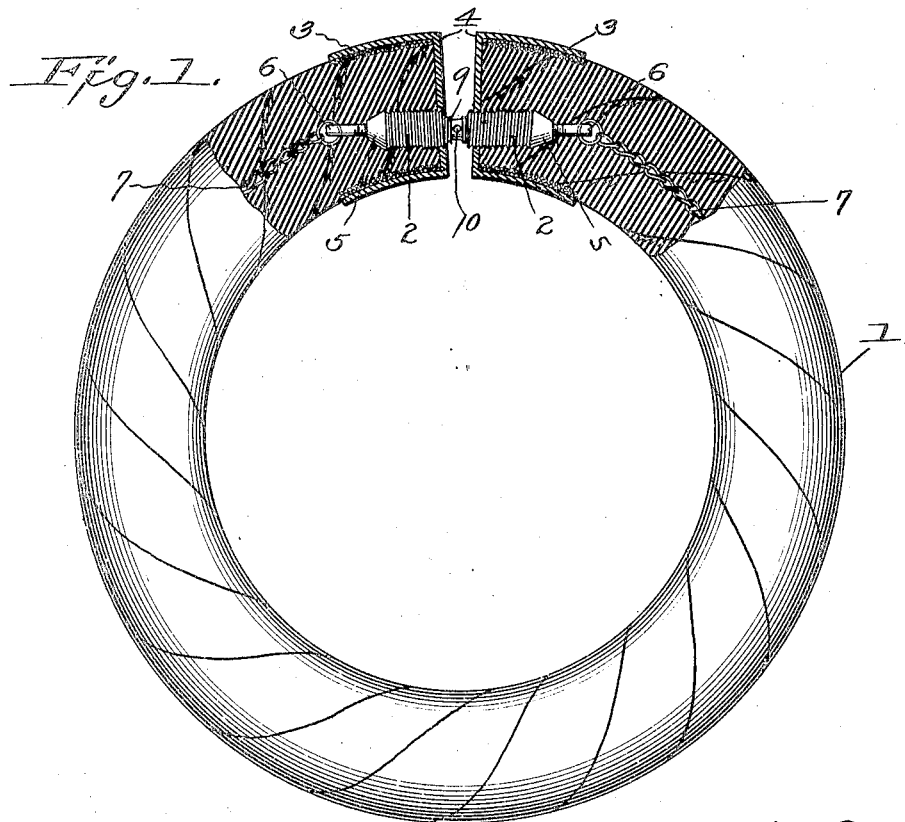
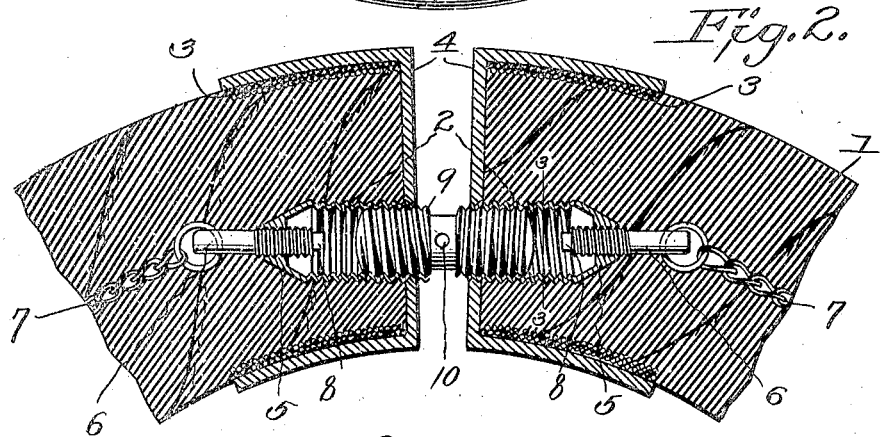
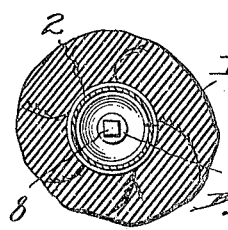
WITNESSES
INVENTOR
F. L. Bigsby
Attorney

UNITED STATES PATENT OFFICE.

FRANK L. BIGSBY, OF KIRKSVILLE, MISSOURI.

EMERGENCY AUTOMOBILE-TIRE.

1,057,388.

Specification of Letters Patent.

Patented Mar. 25, 1913.

Application filed October 3, 1911. Serial No. 652,673.

*To all whom it may concern:*

Be it known that I, FRANK L. BIGSBY, a citizen of the United States, residing at Kirksville, in the county of Adair and State of Missouri, have invented certain new and useful Improvements in Emergency Automobile-Tires, of which the following is a specification.

The present invention relates in general to vehicle tires, and more particularly to an emergency tire which is adapted to be temporarily applied to an automobile, motorcycle, or other vehicle, should the usual pneumatic tire become punctured, the said emergency tire enabling the automobile to be taken to a repair shop without danger or rim cutting or injuring the punctured tire.

The object of the invention is to provide an emergency automobile tire which is very simple and inexpensive in its construction, which can be readily applied to a vehicle wheel or removed therefrom, and which will permit the vehicle to be moved without danger of injuring the punctured pneumatic tire.

A further object of the invention is to provide an emergency tire which comprises few and durable parts, which can be readily adjusted to fit the wheel, and which will occupy a comparatively small amount of space when not in use.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of an emergency tire constructed in accordance with the invention, portions being broken away and shown in section. Fig. 2 is an enlarged sectional view through the abutting ends of the tire, and Fig. 3 is a transverse sectional view on the line 3—3 of Fig. 2.

Corresponding and like parts are referred to in the following description and indicated in all the views of the drawings by the same reference characters.

Specifically describing the present embodiment of the invention, the numeral 1 designates the body portion of the emergency tire, the said body portion being composed of suitable material such as rope. In the event the body portion is composed of rope, it may be treated with tar, pitch, rubberoid paint, or any other suitable substance, and if desired the rope may be inclosed in an outer casing of canvas, leather, or the like. This body portion 1 is designed to be fitted to the wheel and the ends thereof brought together, as indicated in Fig. 1. A cylindrical shell 2 is embedded in each end of the rope body portion, the said shells being both internally and externally threaded. The rope body portion 1 is held in a close engagement with the exterior of the cylindrical shell by means of a binding 3 of wire or similar material, and the said cylindrical shells may be conveniently formed of sheet metal, the threads being pressed therein so that the interior of the shell will engage a screw in the usual manner, while the exterior of the shell is provided with annular ribs so as to be readily engaged by the rope. The opposite ends of the rope body portion are each provided with a cap 4 of rubber or similar material, the said cap serving to hold all of the fibers closely together and to retain the binding wire 3 securely in position. The loose strands of the rope are thereby properly cared for, so that the ends of the body portion have smooth surfaces adapted to fit against each other.

The inner end of each of the cylindrical shells 2 is provided with a conical or tapered portion 5 which is internally threaded to engage a stem 6, the outer end of the stem being connected to a suitable cable such as the twisted wire chain 7 extending through the center of the rope, while the inner end of the stem has a square or angular head 8 adapted to be engaged by a suitable key. By turning the stem 6 and moving them in and out as may be required the chain or cable 7 may be tightened or loosened to admit of the tire being properly fitted to the wheel. One of the cylindrical shells 2 has a right hand thread, while the opposite cylindrical shell 2 has a left hand thread, the said shells being engaged by opposite ends of a right and left hand threaded bolt 9. The middle portion of this bolt is provided at a point between the right and left hand threaded ends thereof with transverse openings 10 adapted to receive a pin or key for the purpose of turning the bolt to bring the ends of the body portion toward or away from each other. It will thus be obvious that the primary adjustment is brought about through the medium of the threaded stems 6, while the emergency tire is finally clamped in position upon the wheel through the medium of the right and left hand threaded bolt 9. As previously explained, this emergency tire is merely designed to be temporarily applied to a vehicle wheel after the usual pneumatic tire has become punctured, the said emergency tire enabling the automobile or like vehicle to be taken to a repair shop without danger of rim cutting or injuring the punctured tire.

Having thus described the invention, what I claim as new and desire to secure by Letters Patent, is:—

1. A tire fastening device adapted for use in conjunction with a tire, comprising tubular shells fitted in opposite ends of the tire and formed of sheet material, the said tubular shells having right and left hand threads respectively pressed outwardly from the interior thereof, a cap applied to each end of the tire to reinforce said ends, a cable extending longitudinally through the tire, the ends of the cable having an operative connection with the tubular shells, and a right and left hand threaded bolt connecting the tubular shells to admit of the ends of the tire being moved toward and away from each other.

2. A device for fastening the ends of a tire including right and left hand internally threaded shells fitted in opposite ends of the tire, stems threaded in the inner ends of the shells, the outer ends of the stems having a polygonal formation to admit of the stems being turned from the interior of the shells, a cable extending longitudinally through the tire and having the ends thereof connected to the respective stems, and a right and left hand threaded bolt connecting the shells to admit of the ends of the tire being moved toward and away from each other.

In testimony whereof I affix my signature in presence of two witnesses.

FRANK L. BIGSBY.

Witnesses:
J. N. WAGGONER,
L. VAN H. GERDINE.